(12) United States Patent
Buer

(10) Patent No.: US 7,761,654 B2
(45) Date of Patent: *Jul. 20, 2010

(54) SYSTEM AND METHOD OF UTILIZING OFF-CHIP MEMORY

(75) Inventor: Mark Buer, Gilbert, AZ (US)

(73) Assignee: Broadcom Corporation, Irvine, CA (US)

(*) Notice: Subject to any disclaimer, the term of this patent is extended or adjusted under 35 U.S.C. 154(b) by 162 days.

This patent is subject to a terminal disclaimer.

(21) Appl. No.: 11/927,570

(22) Filed: Oct. 29, 2007

(65) Prior Publication Data

US 2008/0052450 A1    Feb. 28, 2008

Related U.S. Application Data

(63) Continuation of application No. 10/899,815, filed on Jul. 27, 2004, now Pat. No. 7,325,121.

(60) Provisional application No. 60/502,374, filed on Sep. 12, 2003.

(51) Int. Cl.
*G06F 13/00* (2006.01)
(52) U.S. Cl. .................... 711/103; 711/200; 726/18
(58) Field of Classification Search ................ 711/103, 711/200; 726/18
See application file for complete search history.

(56) References Cited

U.S. PATENT DOCUMENTS

| 6,101,605 | A  | 8/2000  | Buer |
| 6,401,164 | B1 | 6/2002  | Bartoli et al. |
| 6,651,149 | B1 | 11/2003 | Iwasaki |
| 6,748,563 | B1 | 6/2004  | LeBlanc et al. |
| 6,996,547 | B1* | 2/2006 | Tugenberg et al. ............ 705/77 |
| 7,117,352 | B1 | 10/2006 | Giles et al. |
| 7,149,901 | B2 | 12/2006 | Herbert et al. |
| 2005/0005156 | A1* | 1/2005 | Harper ....................... 713/200 |

OTHER PUBLICATIONS

Using Nonvolatile Static RAMs, Mar. 29, 2001, Dallas Semiconductor/www.maxinn-ic.com, retrieved from Internet on Jan. 19, 2007 from http://www.maxim-ic.com/appnotes.cfm/an_pk540.
Trusted Computing Platform Alliance (TCPA) Main Specification, Feb. 22, 2002, Trusted Computing Group, Version 1.1b, pp. 1 and 320.

* cited by examiner

*Primary Examiner*—Brian R Peugh
*Assistant Examiner*—Jared I Rutz
(74) *Attorney, Agent, or Firm*—McAndrews, Held & Malloy, Ltd.

(57) ABSTRACT

One or more methods and/or systems of utilizing a memory external to an integrated circuit chip are presented. In one embodiment, the system comprises an Integrated circuit containing a logic circuitry, a one time programmable memory, a control processor, and a data interface. In one embodiment, a method of storing data into a memory comprises programming one or more bits of a one time programmable memory, generating an Identifier from the integrated circuit chip, and using the identifier to store data within the memory.

24 Claims, 3 Drawing Sheets

SYSTEM AND METHOD OF UTILIZING OFF-CHIP MEMORY

RELATED APPLICATIONS/INCORPORATION BY REFERENCE

This application is a continuation of U.S. patent application Ser. No. 10/899,815, filed on Jul. 27, 2004, now U.S. Pat. No. 7,325,121, which makes reference to and claims priority from U.S. Provisional Patent Application Ser. No. 60/502,374, entitled "ON-CHIP TCPA FUNCTION", filed on Sep. 12, 2003, the complete subject matter of which is incorporated herein by reference in its entirety.

This application is also related to U.S. patent application Ser. No. 10/899,808, entitled "SYSTEM AND METHOD OF SHARING MEMORY BY ARBITRATING THROUGH AN INTERNAL DATA BUS", filed on Jul. 27, 2004, the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Invariably, the implementation of additional features and functions provided by an Integrated circuit requires additional logic and memory Often, this necessitates the incorporation of on-chip memory In order to implement these features and functions. Unfortunately, this translates to increased on-chip space requirements, necessitating the use of additional silicon to fabricate the integrated circuit.

Other negative effects of incorporating memory within an Integrated circuit chip relate to increased power consumption and its associated power dissipation. The increased power consumption may have a significant impact on battery life while the Increased power dissipation may alter the stable operating environment of the integrated circuit chip and its surrounding circuitry.

Another disadvantage of using on-chip memory relates to flexibility issues. The critical processes performed on the chip are limited to storage provided by the on-chip memory. Unfortunately, the storage capacity provided by the on-chip memory cannot be adjusted once the integrated circuit is fabricated. This may be a significant disadvantage when the memory requirements of an integrated circuit chip are increased.

Furthermore, the implementation of such on-chip memory increases the unit cost of manufacturing an integrated circuit. These additional costs may have a significant negative impact on a manufacturer's profit margin and its ability to competitively market its products.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide for a method and system of utilizing a memory external to integrated circuit. In one embodiment, the memory comprises a non-volatile memory. In one embodiment the non-volatile memory comprises a flash memory.

In one embodiment, a method of utilizing memory external to an integrated circuit comprises programming one or more bits In a one time programmable memory, wherein the one time programmable memory resides within the integrated circuit chip. Further, the method comprises generating an identifier from the integrated circuit chip and subsequently using the identifier to store data within an off-chip memory.

In one embodiment, a method of utilizing an off-chip memory that is external to an integrated circuit chip comprises programming one or more bits In a one time programmable memory of the integrated circuit chip, generating an identifier, attaching the identifier to a block of data to generate an identifiable block of data, storing the identifiable block of data within an off-chip memory communicatively coupled to the integrated circuit chip, locating the identifier from the off-chip memory, and reading the block of data, In one embodiment, a system for utilizing an off-chip memory external to an Integrated circuit chip comprises a logic circuitry, a data interface for receiving and transmitting data, a one time programmable memory, and a processor used for controlling the one time programmable memory and the logic circuitry.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention may be found in a system and method of using memory that is located externally to an integrated circuit chip. Aspects of the invention provide a system and method of Incorporating the use of off-chip memories of varying capacities. As a consequence, larger storage capacities may be obtained by flexibly increasing the capacity of an external off-chip memory, when desired. The method of accessing the off-chip memory comprises using a one time programmable memory. The one time programmable memory (OTP) is implemented on-chip and utilizes a significantly reduced amount of silicon area compared to an integrated circuit chip that is implemented using conventional memory techniques. In one embodiment, the off-chip memory comprises a non-volatile memory. In one embodiment, the integrated circuit chip complies with one or more versions (e.g., versions 1.0, 1.1, 1.1b, and/or 1.2) of the Trusted Computing Platform Alliance (TCPA) specification for Trusted Platform Modules (TPM).

Advantages of the present Invention may include, for example, a reduction in silicon required to implement an integrated circuit chip because a one time programmable memory (requiring less silicon to implement) is used instead of conventional on-chip memory. This allows a manufacturer to fabricate an integrated circuit chip using smaller dimensions. Furthermore, memory capacity may be flexibly increased (or decreased) by interfacing and/or communicatively coupling the integrated circuit chip with an external or off-chip memory of larger (or smaller) capacity, whenever required. For example, increases in memory capacity may be required to increase the performance of the integrated circuit. When this occurs, an off-chip memory of larger capacity may be used to easily replace the existing off-chip memory. Additionally, environmental factors, such as temperature, may affect operational performance and stability of the integrated circuit and its peripheral circuitry; as a result, an integrated circuit designer may wish to limit the power consumption/dissipation of the integrated circuit chip by designing a chip using a minimal amount of silicon. As a consequence, the designer may wish to utilize off-chip memory as opposed to on-chip memory.

Figure 1:
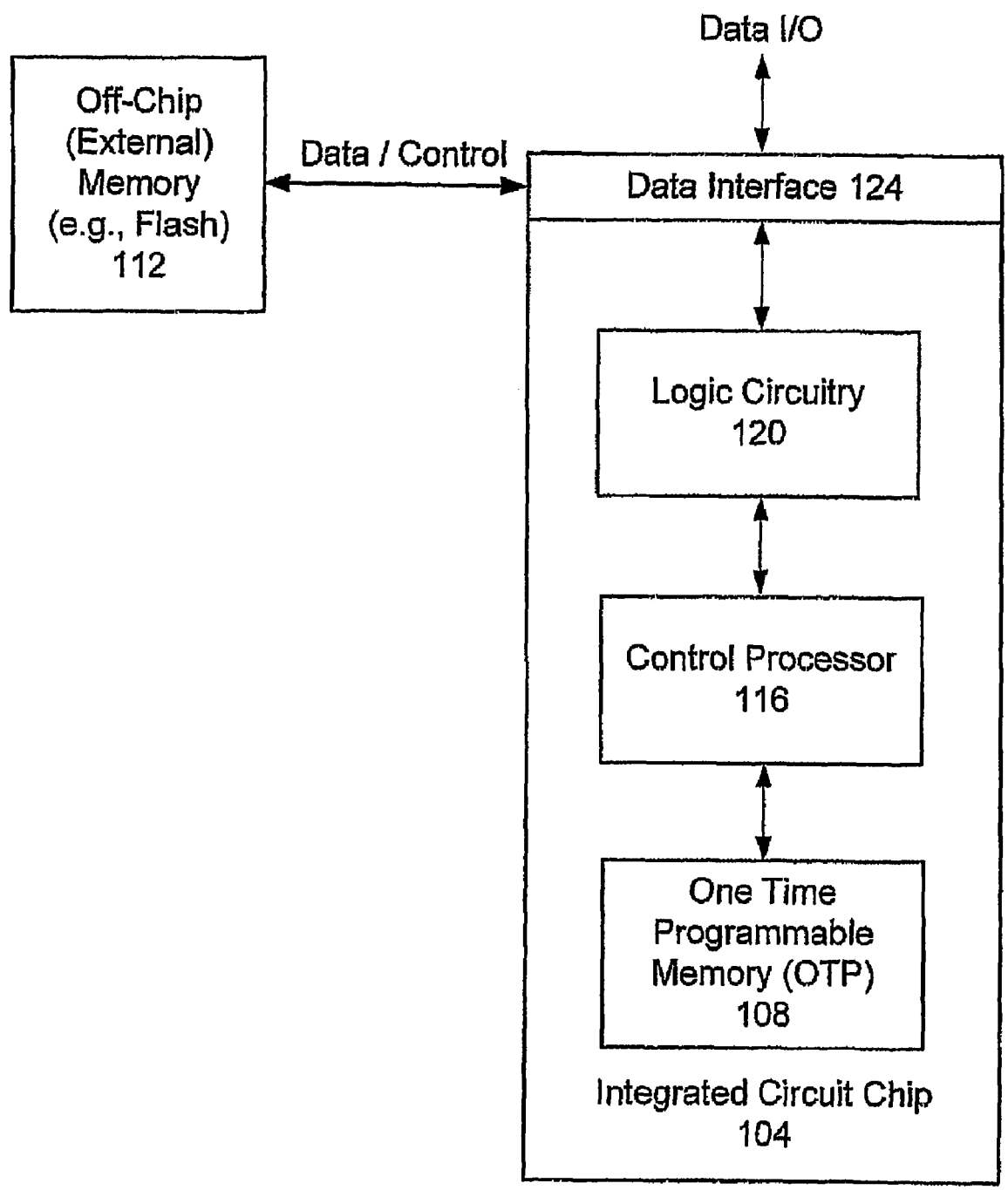
FIG. 1 is a block diagram of a system that utilizes an off-chip memory that is located external to an integrated circuit chip in accordance with an embodiment of the invention.

FIG. 1 is a block diagram of a system that utilizes an off-chip memory 112 that is located externally to an integrated circuit chip 104 in accordance with an embodiment of the invention. The system comprises an integrated circuit chip 104 and an off-chip (external) memory 112. The integrated circuit chip 104 comprises a control processor 116, logic circuitry 120, a one time programmable memory (OTP) 108, and a data interface 124. The control processor 116 processes the data it receives using the logic circuitry 120. The data Is processed into one or more segments or blocks of data such that the one or more blocks of data may be stored in the off-chip (external) memory 112. As shown, the data is either transmitted to or received from the Integrated circuit chip 104 by way of the data interface 124. Implementing the one time programmable memory (OTP) 108 may require a significantly reduced amount of silicon area compared to an integrated circuit chip that is implemented using conventional memory. In one embodiment, the OTP 108 is implemented using standard CMOS technology. The one time programmable memory (OTP) 108 generates one or more identifiers used in the identification of the one or more blocks of data. These blocks of data are stored in a memory external to the integrated circuit chip 104. In one embodiment, the one time programming memory (OTP) 108 comprises a programmable memory array in which one or more of its bits are sequentially programmed. The one or more programmed bits are used to generate one or more identifiers. Aspects of the invention allow the bits to be programmed by way of control provided by the control processor 116. The control processor 116 may utilize the logic circuitry 120 when the bits of the OTP 108 are programmed. In one embodiment, the states of the one or more bits may not be reversed after the bits are programmed. In one embodiment, the bit states may comprise a logical high (e.g., "1") or logical low state ("0"). In one embodiment, the programmed bits of the OTP may implement a counter. In one embodiment, the number of bits used to implement the one time programmable memory comprises approximately 100,000 bits. In another embodiment, the number of bits used to implement the OTP 108 comprises at least 100,000 bits or a number of bits compatible with the one or more processes or functions performed by the integrated circuit chip 104. The OTP 108 may comprise a logic device, or programmable logic device, or any other device capable of performing one time programming of a number of bits. In one embodiment, the OTP 108 may be implemented using CMOS digital logic circuitry.

In one embodiment, the one or more Identifiers are created sequentially, using a bit sequence or output bits generated by the OTP 108. The bits provided by the OTP 108 may be further processed by the logic circuitry 120, in order to generate the one or more identifiers. In one embodiment, the one or more identifiers comprise a sequence of binary bits. The identifiers are subsequently appended or attached to their corresponding one or more data blocks. Thereafter, the one or more identifiable data blocks (data blocks that are appended or attached with corresponding identifiers) are stored into the off-chip (external) memory 112. The one or more identifiable data blocks may be read out at a later time. Control provided by the control processor 116 may be used to facilitate write/read operations to the off-chip memory 112. In one embodiment, the one or more data blocks comprise one or more keys used for encrypting or decrypting data received by a computing device that utilizes the integrated circuit chip 104. In another embodiment, the one or more data blocks comprise one or more passwords or authentication data.

As illustrated in FIG. 1, the integrated circuit chip 104 communicates with the off-chip (external) memory 112 by way of one or more control and data signals. In one embodiment, the data interface 124 may comprise a low pin count (LPC) interface. The data (e.g., Data Input/Output or Data I/O) received by the Integrated circuit chip 104 may be segmented into data blocks or data segments by the logic circuitry 120. The off-chip memory 112 stores one or more data blocks with their corresponding identifiers. Subsequently, the blocks of data stored within the off-chip memory 112 may be read or accessed by the integrated circuit chip 104 by way of identifying the data blocks using the one or more identifiers. In one embodiment, the integrated circuit chip 104 utilizes the off-chip memory 112 as a means to store readily used data. In one embodiment, the off-chip memory 12 may comprise a non-volatile memory. In one embodiment, the off-chip memory may comprise a flash memory, an electrically erasable read only memory, or a battery backed memory.

Figure 2:
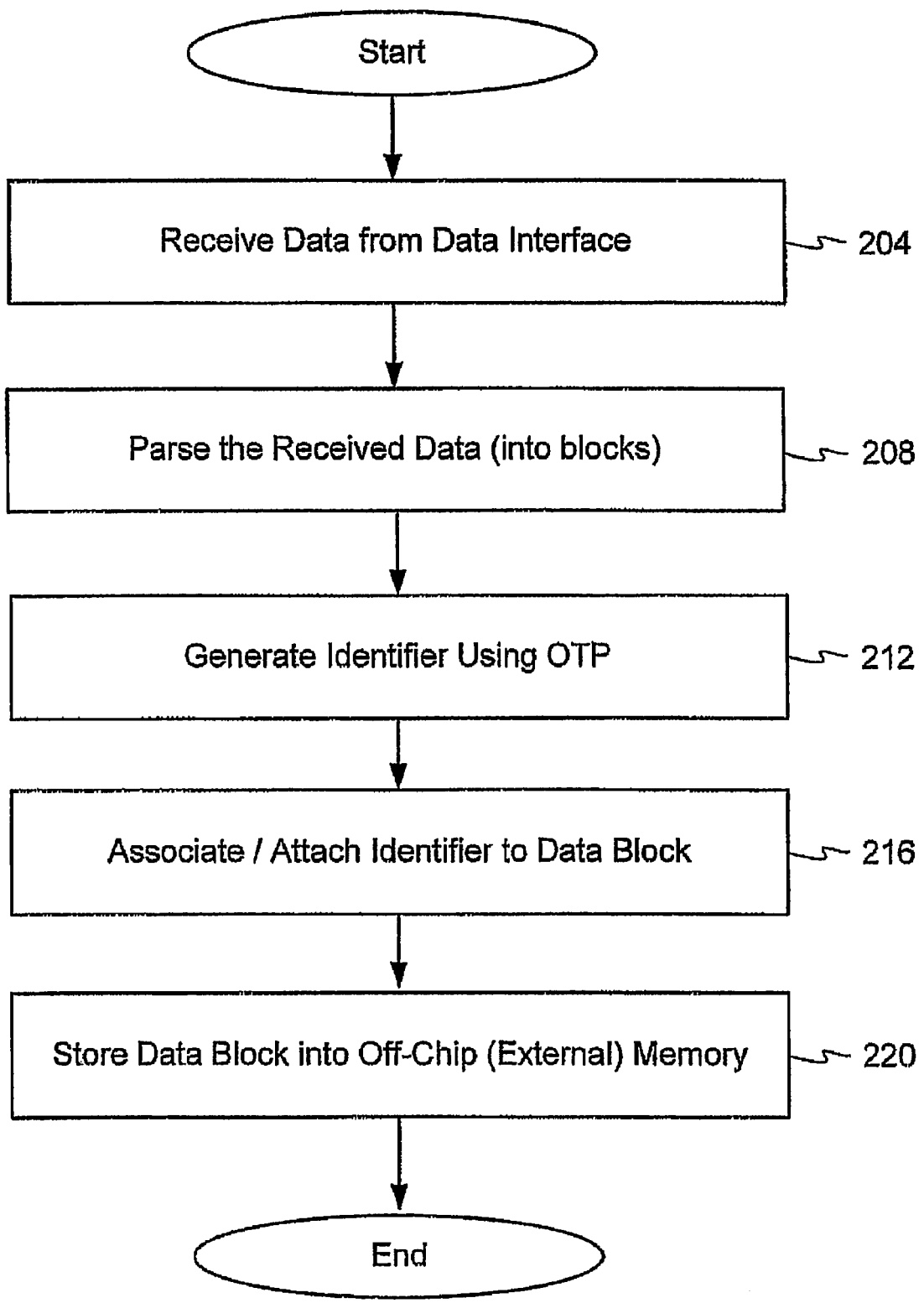
FIG. 2 is an operational flow diagram illustrating the process of storing data into an off-chip memory in accordance with an embodiment of the invention.

FIG. 2 is an operational flow diagram illustrating the process of storing data into an off-chip memory in accordance with an embodiment of the invention. At step 204, data to be stored is received by the integrated circuit chip, for processing by the logic circuitry (as previously described in relation to FIG. 1). At step 208, the received data is parsed or segmented into one or more data blocks by way of the logic circuitry. At step 212, one or more identifiers are generated using the OTP bits (previously described in reference to FIG. 1). One or more bits of the OTP may be programmed by way of processing performed by the control processor using the logic circuitry that was earlier described in relation to FIG. 1. In one embodiment, the bits of the OTP are used to generate the one or more identifiers for each data block generated by the logic circuitry. At step 216, one or more identifiers are associated and attached (or appended) to the one or more data blocks to create one or more identifiable data blocks. Subsequently, at step 220, the one or more identifiable data blocks are stored into the off-chip memory.

Figure 3:
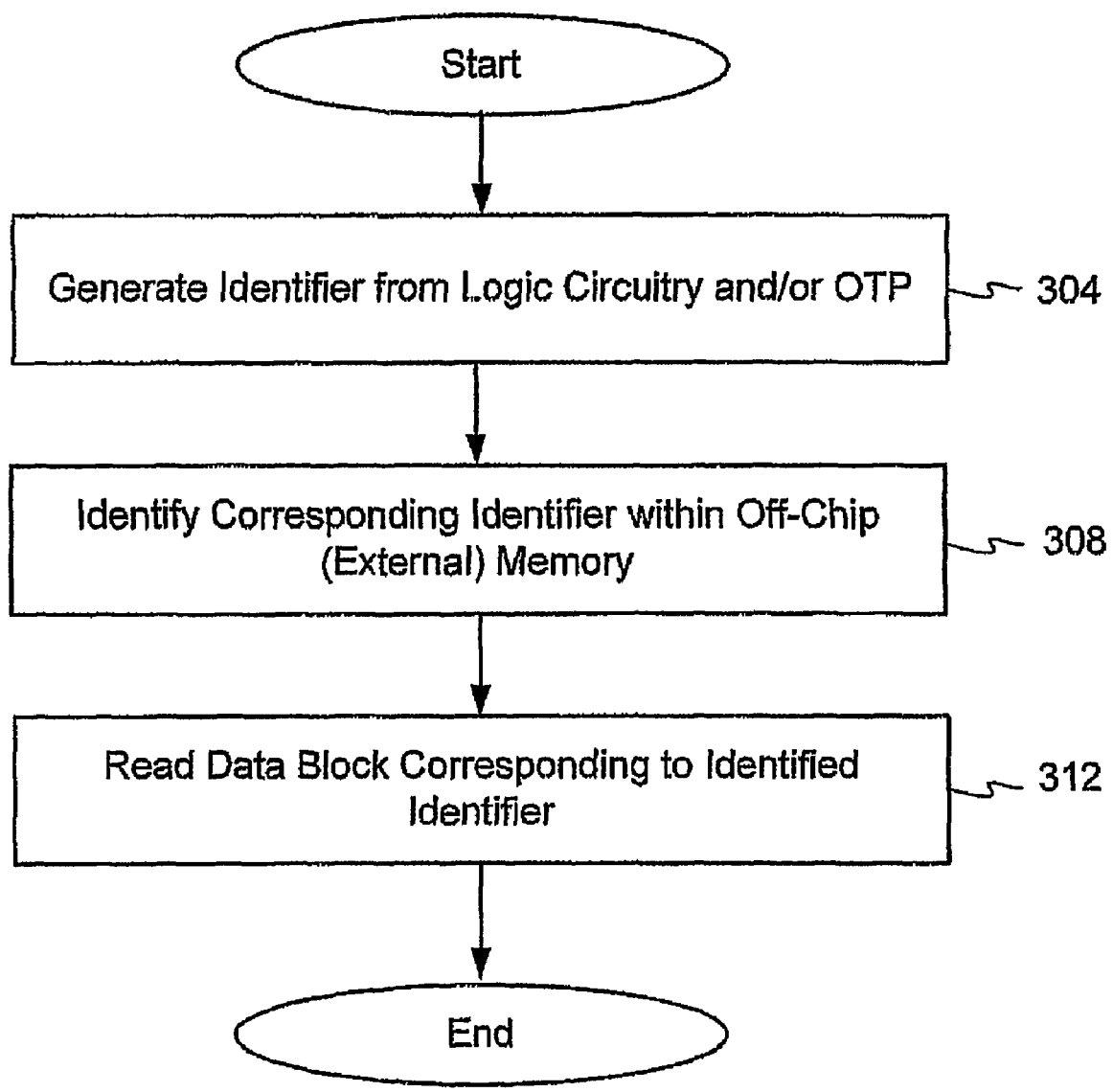
FIG. 3 is an operational flow diagram illustrating the process of reading data from an off-chip memory in accordance with an embodiment of the invention.

FIG. 3 is an operational flow diagram illustrating the process of reading data from an off-chip memory in accordance with an embodiment of the invention. At step 304, one or more identifiers are generated by the integrated circuit chip (as shown in FIG. 1) in order to locate a particular block of data stored In the off-chip memory. For example, the control processor processes data within the logic circuitry and/or the OTP in order to generate the specific identifier corresponding to the block of data. The identifier may comprise any number of bits. At step 308, the identifier is used to identify or uniquely locate the block of data stored in the off-chip (external) memory. The logic circuitry may be used to compare a particular identifier with one or more identifiers in the off-chip memory. At step 312, the appropriate data block is read after the particular identifier is located within the off-chip memory.

In one embodiment, the integrated circuit chip referenced in FIG. 1 complies with one or more versions (e.g., versions 1.0, 1.1, 1.1b, and/or 1.2) of the Trusted Computing Platform Alliance (TCPA) specification for Trusted Platform Modules (TPM). The one or more specifications may be downloaded at the following website: www.trustedcomputinggroup.org. The one or more specifications are incorporated herein by reference in their entireties. In one embodiment, the integrated circuit chip described in reference to FIG. 1 implements one or more security functions in compliance with versions 1.0, 1.1, 1.1b, or 1.2 of the above-referenced TCPA specification. In this embodiment, the one time programmable memory (OTP) may generate one or more identifiers used to store data within an off-chip (external) memory. For example, the one or more identifiers previously described may be used to identify and store one or more passwords and/or keys used in one or more encryption/decryption or authentication processes. These encryption/decryption or authentication processes may be defined in the above-referenced TCPA specification.

While the invention has been described with reference to certain embodiments, it will be understood by those skilled in the art that various changes may be made and equivalents may be substituted without departing from the scope of the Invention. In addition, many modifications may be made to adapt a particular situation or material to the teachings of the invention without departing from its scopes Therefore, it is intended that the invention not be limited to the particular embodiment disclosed, but that the invention will include all embodiments falling within the scope of the appended claims.

What is claimed is:

1. A system for utilizing an off-chip memory comprising:
at least one circuitry for storing one or more bits, said at least one circuitry used for communicatively coupling said integrated circuit chip and said off-chip memory, said at least one circuitry used for transmitting one or more identifiable data blocks between said off-chip memory and said integrated circuit chip; said at least one circuitry using said one or more bits to generate one or more data block identifiers, each of said one or more block identifiers appended to a corresponding block of one or more data blocks to create said one or more identifiable data blocks, wherein each of said one or more data block identifiers is used to uniquely locate its corresponding data block among said one or more data blocks.

2. The system of claim 1 wherein said at least one circuitry comprises a non-volatile memory.

3. The system of claim 1 wherein said at least one circuitry comprises a flash memory.

4. The system of claim 1 wherein said at least one circuitry comprises a low pin count interface.

5. The system of claim 1 wherein said one or more data blocks comprise one or more keys used for encrypting or decrypting data.

6. The system of claim 1 wherein said at least one circuitry may be used for comparing a particular identifier with one or more identifiers in said off-chip memory such that a data block corresponding to said particular identifier may be read from said off-chip memory.

7. A system for utilizing an off-chip memory comprising:
a single integrated circuit chip, said integrated circuit chip comprising:
at least one first circuitry for storing one or more bits;
at least one second circuitry for communicatively coupling said integrated circuit chip and said off-chip memory, said at least one second circuitry capable of transmitting one or more identifiable data blocks between said off-chip memory and said integrated circuit chip; and
at least one third circuitry for using said one or more bits to generate one or more data block identifiers, each of said one or more block identifiers appended to a corresponding block of one or more data blocks to create said one or more identifiable data blocks, wherein each of said one or more data block identifiers is used to uniquely locate its corresponding data block among said one or more data blocks.

8. The system of claim 7 wherein said at least one first circuitry comprises a non-volatile memory.

9. The system of claim 7 wherein said at least one first circuitry comprises a flash memory.

10. The system of claim 7 wherein said at least one second circuitry comprises a low pin count interface.

11. The system of claim 7 wherein said one or more data blocks comprise one or more keys used for encrypting or decrypting data.

12. The system of claim 7 wherein said at least one third circuitry may be used for comparing a particular identifier with one or more identifiers in said off-chip memory such that a data block corresponding to said particular identifier may be read from said off-chip memory.

13. A system for utilizing an off-chip memory comprising:
a single integrated circuit chip, said integrated circuit chip comprising:
a one time programmable memory for storing one or more bits;
a data interface for communicatively coupling said integrated circuit chip and said off-chip memory, said data interface capable of transmitting one or more identifiable data blocks between said off-chip memory and said integrated circuit chip; and
a logic circuitry configured for using said one or more bits to generate one or more data block identifiers, each of said one or more block identifiers appended to a corresponding block of one or more data blocks to create said one or more identifiable data blocks, wherein each of said one or more data block identifiers is used to uniquely locate its corresponding data block among said one or more data blocks.

14. The system of claim 13 wherein said off-chip memory comprises a non-volatile memory.

15. The system of claim 13 wherein said off-chip memory comprises a flash memory.

16. The system of claim 13 wherein said data interface comprises a low pin count interface.

17. The system of claim 13 wherein said one or more data blocks comprise one or more keys used for encrypting or decrypting data.

18. The system of claim 13 wherein said logic circuitry may be used for comparing a particular identifier with one or more identifiers in said off-chip memory such that a data block corresponding to said particular identifier may be read from said off-chip memory.

19. A method of utilizing an off-chip memory comprising:
programming one or more bits of a one time programmable memory to generate one or more programmed bits;
generating one or more data block identifiers using said programmed bits; and
appending each of said one or more block identifiers to a corresponding block of one or more data blocks to create one or more identifiable data blocks, wherein each of said one or more data block identifiers is used to uniquely locate its corresponding data block among said one or more data blocks; and transmitting said one or more identifiable data blocks between said off-chip memory and said integrated circuit chip.

20. The method of claim 19 wherein said one or more data blocks comprise one or more keys used for encrypting or decrypting data.

21. The method of claim 19 comprising comparing a particular identifier with one or more identifiers stored in said off-chip memory such that a data block corresponding to said particular identifier may be read from said off-chip memory.

22. A system for utilizing an off-chip memory comprising:
a single integrated circuit chip, said integrated circuit chip comprising:
at least one circuitry for storing one or more bits;
said at least one circuitry for communicatively coupling said integrated circuit chip and said off-chip memory, said at least one circuitry capable of transmitting one or more identifiable data blocks between said off-chip memory and said integrated circuit chip; and
said at least one circuitry for using said one or more bits to generate one or more data block identifiers, each of said one or more block identifiers appended to a corresponding block of one or more data blocks to create said one or more identifiable data blocks, wherein each of said one or more data block identifiers is used to uniquely locate its corresponding data block among said one or more data blocks.

23. The system of claim 22 wherein said one or more data blocks comprise one or more keys used for encrypting or decrypting data.

24. The system of claim 22 wherein said at least one circuitry may be used for comparing a particular identifier with one or more identifiers in said off-chip memory such that a data block corresponding to said particular identifier may be read from said off-chip memory.

* * * * *